US011862111B1

(12) United States Patent
Na et al.

(10) Patent No.: US 11,862,111 B1
(45) Date of Patent: Jan. 2, 2024

(54) SEMICONDUCTOR DEVICE

(71) Applicant: SAMSUNG ELECTRONICS CO., LTD., Suwon-si (KR)

(72) Inventors: Se Whan Na, Suwon-si (KR); Jong-Hee Na, Suwon-si (KR); Byoungyoon Jang, Suwon-si (KR); Yoochae Chung, Suwon-si (KR); Hyunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/096,352

(22) Filed: Jan. 12, 2023

(30) Foreign Application Priority Data

Aug. 3, 2022 (KR) ........................ 10-2022-0096803

(51) Int. Cl.
*G09G 3/3291* (2016.01)
*G09G 3/20* (2006.01)

(52) U.S. Cl.
CPC ......... *G09G 3/3291* (2013.01); *G09G 3/2096* (2013.01); *G09G 2310/0291* (2013.01); *G09G 2320/0276* (2013.01); *G09G 2320/041* (2013.01); *G09G 2320/0626* (2013.01); *G09G 2320/0673* (2013.01); *G09G 2330/028* (2013.01); *G09G 2354/00* (2013.01); *G09G 2360/16* (2013.01)

(58) Field of Classification Search
CPC ... G09G 2320/0673; G09G 2320/0276; G09G 2320/041; G09G 2320/0646; G09G 3/20; G09G 3/2092; G09G 3/2007; G09G 3/3406; G09G 2360/16; G09G 2360/145; G09G 5/06
See application file for complete search history.

(56) References Cited

U.S. PATENT DOCUMENTS

| | | | | |
|---|---|---|---|---|
| 7,142,185 | B2 | 11/2006 | Aoki | |
| 10,089,931 | B2 | 10/2018 | Aflatooni et al. | |
| 11,087,697 | B2 | 8/2021 | Ku et al. | |
| 11,308,843 | B2 | 4/2022 | Kim et al. | |
| 2004/0135800 | A1 * | 7/2004 | Shiomi ................ | G09G 3/3648 345/691 |
| 2005/0128113 | A1 * | 6/2005 | Kyung-Myun ...... | G09G 3/3688 341/138 |
| 2007/0262972 | A1 * | 11/2007 | Nakata ................. | G09G 3/3696 345/204 |
| 2008/0111828 | A1 | 5/2008 | Ahn et al. | |
| 2022/0101772 | A1 | 3/2022 | Wetherell et al. | |

* cited by examiner

*Primary Examiner* — Dong Hui Liang
(74) *Attorney, Agent, or Firm* — Sughrue Mion, PLLC

(57) ABSTRACT

A semiconductor device is provided. The semiconductor device includes: an offset compensation circuit configured to obtain first data including first low-order bit data, second low-order bit data and high-order bit data, select two compensation values from among a plurality of compensation values based on the first low-order bit data, identify a final compensation value by interpolating the two compensation values based on the second low-order bit data, and compensate the final compensation value to generate second data; and a source driver configured to interpolate and output two gamma voltages from among a plurality of gamma voltages based on the second data.

20 Claims, 13 Drawing Sheets

FIG. 4

400

401 402 403

| | | | MODE0 | | | MODE1 | | | MODE2 | | |
|---|---|---|---|---|---|---|---|---|---|---|---|
| | | | MSB IS[13:8] | | | MSB IS[13:8] | | | MSB IS[13:8] | | |
| | | | TAP0 | TAP1 | TAP2 | TAP0 | TAP1 | TAP2 | TAP0 | TAP1 | TAP2 |
| LSB IS[7:4] | | 0000 | 2 | 2 | 2 | 3 | 3 | 4 | 3 | 3 | 4 |
| | | 0001 | | | | | | | | | |
| | | 0010 | | | | | | | | | |
| | | 0011 | | | | | | | | | |
| | | 0100 | ... | ... | ... | ... | ... | ... | ... | ... | ... |
| | | 0101 | | | | | | | | | |
| | | 0110 | | | | | | | | | |
| | | 0111 | | | | | | | | | |
| | | 1000 | 0 | 0 | 0 | 0 | 1 | 1 | 1 | 1 | 2 |
| | | 1001 | | | | | | | | | |
| | | 1010 | | | | | | | | | |
| | | 1011 | | | | | | | | | |
| | | 1100 | ... | ... | ... | ... | ... | ... | ... | ... | ... |
| | | 1101 | | | | | | | | | |
| | | 1110 | | | | | | | | | |
| | | 1111 | -4 | -3 | -3 | -3 | -3 | -2 | -2 | -2 | -2 |
| TEMP | LOW | GAIN | 0.8 | 0.8 | 0.8 | 0.9 | 0.9 | 0.9 | 0.8 | 0.8 | 0.8 |
| | | OFFSET | 2 | 2 | 1 | 1 | 2 | 1 | 2 | 2 | 1 |
| | MID | GAIN | 1.2 | 1.2 | 1.2 | 1.2 | 1.2 | 1.2 | 1.2 | 1.2 | 1.2 |
| | | OFFSET | -1 | -1 | -2 | -1 | -1 | -2 | -2 | -2 | -2 |
| | HIGH | GAIN | 0.8 | 0.8 | 0.8 | 0.9 | 0.9 | 0.9 | 0.8 | 0.8 | 0.8 |
| | | OFFSET | 1 | 2 | 1 | 2 | 1 | 2 | 1 | 2 | 1 |

500

900

SEMICONDUCTOR DEVICE

CROSS-REFERENCE TO RELATED APPLICATION

This application claims priority to Korean Patent Application No. 10-2022-0096803, filed in the Korean Intellectual Property Office on Aug. 3, 2022, the disclosure of which is incorporated by reference herein in its entirety.

BACKGROUND

Field

The present disclosure relates to a semiconductor device.

Description of Related Art

A display panel provides various visual information to a user by displaying an image. The display panel includes a plurality of pixels, and each of the plurality of pixels expresses light of a luminance to display an image. A display driver integrated circuit (DDIC) is used to drive the pixel.

A source driver of the DDIC may select a gamma voltage corresponding to a digital value of image data from among a plurality of gamma voltages, and may apply the selected gamma voltage to a source line of the display panel. As a size and resolution of display panels increase, the number of digital bits of image data increases. An area of a decoder circuit that selects the gamma voltage may increase exponentially in proportion to the increased number of bits of the image data. Accordingly, an amplifier interpolation scheme has been developed to reduce the circuit area. In this interpolation scheme, representative gamma voltages are selected by high-order bits of the image data, and intermediate gamma voltages between the selected representative gamma voltages are selected by the remaining low-order bits. However, related interpolation schemes may result in nonlinearity (INL) and cause an offset due to an operation mode and an ambient temperature.

SUMMARY

One or more example embodiments may improve integral nonlinearity (INL) of an interpolation scheme.

One or more example embodiments may compensate for an offset of a source driver according to an operation mode and an ambient temperature.

According to an aspect of an example embodiment, a semiconductor device includes: an offset compensation circuit configured to obtain first data including first low-order bit data, second low-order bit data and high-order bit data, select two compensation values from among a plurality of compensation values based on the first low-order bit data, identify a final compensation value by interpolating the two compensation values based on the second low-order bit data, and compensate the final compensation value to generate second data; and a source driver configured to interpolate and output two gamma voltages from among a plurality of gamma voltages based on the second data.

According to an aspect of an example embodiment, a semiconductor device for a display device includes: a gamma converter configured to receive n-bit image data and gamma-correct the n-bit image data to generate m-bit gamma image data; a storage circuit configured to store a look-up table including a plurality of compensation values corresponding to the m-bit gamma image data; a compensation circuit configured to identify two compensation values corresponding to a high-order bit data value and a first low-order bit data value of the m-bit gamma image data, from among the plurality of compensation values, and compensate the m-bit gamma image data based on a final compensation value obtained by interpolating the two compensation values using a second lower-order bit data value of the m-bit gamma image data to output a compensated gamma image; and a dithering circuit configured to dither the compensated gamma image into n-bit data and outputs the n-bit data (m and n being natural numbers greater than one).

According to an aspect of an example embodiment, a semiconductor device includes: a display panel including a plurality of pixels connected to a plurality of gate lines and a plurality of source lines; a gamma voltage generator configured to generate a plurality of gamma voltages having different voltage levels; a source driver connected to the plurality of source lines, and configured to generate an output signal corresponding to n-bit data using the plurality of gamma voltages, and transmit the output signal to a corresponding source line of the plurality of source lines; and a driving controller configured to gamma-correct an n-bit input image signal to generate m-bit gamma image data, select two compensation values corresponding to first low-order bit data of the m-bit gamma image data from among a plurality of compensation values, interpolate the two compensation values based on a second low-order bit data of the m-bit gamma image data to obtain a final compensation value, and add the final compensation value to the m-bit gamma image data to generate the n-bit data (n being a natural number greater than one and m being a natural number greater than n).

BRIEF DESCRIPTION OF DRAWINGS

The above and other aspects and features will be more apparent from the following description of embodiments with reference to the attached drawings, in which:

FIG. 4 illustrates a look-up table (LUT) stored in a semiconductor device according to an example embodiment;

DETAILED DESCRIPTION

Figure 1:
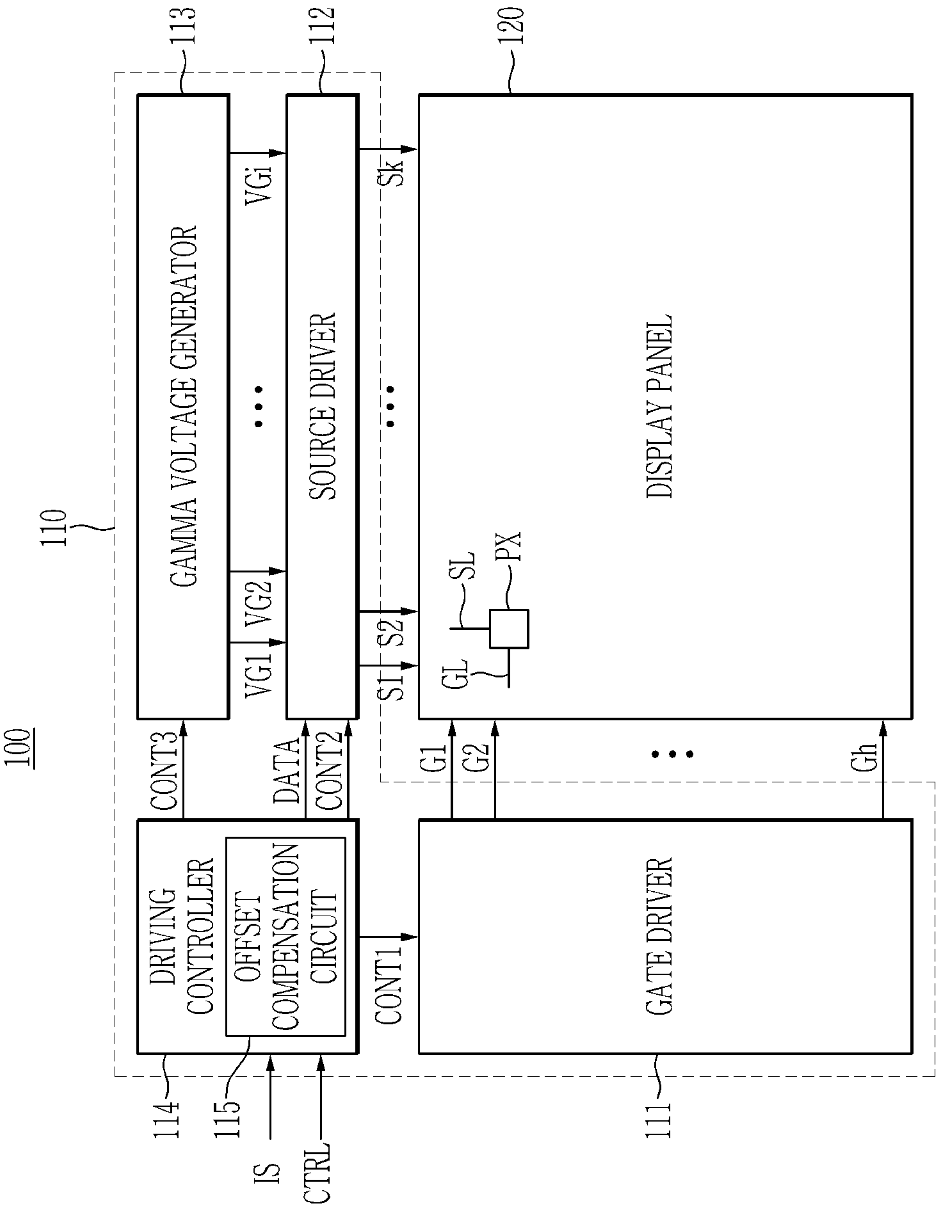
FIG. 1 illustrates a block diagram of a display device according to an example embodiment.

Example embodiments will be described more fully hereinafter with reference to the accompanying drawings. As those skilled in the art would realize, the described embodiments may be modified in various different ways, without departing from the spirit or scope of the present invention.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a block diagram of a display device according to an example embodiment.

Referring to FIG. 1, a display device 100 according to an example embodiment may include a display driving circuit 110 and a display panel 120. In some example embodiments, the display device 100 may further include a power supply circuit such as a DC/DC converter that provides a driving voltage to the display driving circuit 110 and the display panel 120.

The display panel 120 may include a plurality of pixels PX for displaying an image. Each pixel PX may be connected to a corresponding source line SL among a plurality of source lines and a corresponding gate line GL among a plurality of gate lines. Each pixel PX may receive a data signal from the source line SL when a gate signal is supplied to the gate line GL. Each pixel PX may emit light corresponding to an inputted data signal. The plurality of pixels PX may display an image in units of one frame.

When the display device 100 is an organic light emitting display device, each of the pixels PX may include a plurality of transistors including a driving transistor and an organic light emitting diode. The driving transistor included in the pixel PX may supply a current corresponding to the data signal to the organic light emitting diode, so that the organic light emitting diode may emit light with a luminance that corresponds to the inputted data signal. When the display device 100 is a liquid crystal display device, each of the pixels PX may include a switching transistor and a liquid crystal capacitor. The pixel PX may control transmittance of a liquid crystal in response to the data signal so that light of a luminance that corresponds to the inputted data signal may be supplied to the outside.

Although one pixel PX is illustrated as being connected to one source line SL and one gate line GL in FIG. 1, the connection structure of the signal line of the pixel PX of the display device according to example embodiments is not limited thereto. For example, various signal lines may be additionally connected to correspond to the circuit structure of the pixel PX. In example embodiments, the pixel PX may be implemented in various forms.

The display driving circuit 110 may include a gate driver 111, a source driver 112, a gamma voltage generator 113, and a driving controller 114. Some or all of the gate driver 111, the source driver 112, the gamma voltage generator 113, and the driving controller 114 may be implemented on the same semiconductor die, chip, or module, or each of them may be implemented with a separate semiconductor die, chip, or module. In some example embodiments, the gate driver 111 and/or the source driver 112 may be implemented on the same substrate as the display panel 120. In this case, the gate driver 111 and/or the source driver 112 may be disposed on the periphery of the display panel 120.

The gate driver 111 may provide a plurality of gate signals (G1, G2, . . . , Gh) to the display panel 120. The plurality of gate signals (G1, G2, . . . , Gh) may be pulse signals having an enable level and a disable level. The plurality of gate signals (G1, G2, . . . , Gh) may be applied to a plurality of gate lines GL. When the gate signal of the enable level is applied to the gate line GL connected to the pixel PX, the data signal applied to the source line SL connected to the pixel PX may be transmitted to the pixel PX.

The source driver 112 may receive data DATA in a form of a digital signal from the driving controller 114, and may convert the data DATA into data signals (S1, S2, . . . , Sk) in a form of an analog signal. Here, the data DATA may include grayscale information corresponding to each pixel PX for displaying image data IS on the display panel 120. The source driver 112 may transmit a plurality of data signals (S1, S2, . . . , Sk) to the display panel 120 according to a source driver control signal CONT2 provided from the driving controller 114. The source driver 112 may be referred to as a data driver.

The gamma voltage generator 113 may generate a plurality of gamma voltages (VG1, VG2, . . . , VGi) to provide them to the source driver 112. The plurality of gamma voltages (VG1, VG2, . . . , VGi) may have i different voltage levels. The plurality of gamma voltages (VG1, VG2, . . . , VGi) may be used by the source driver 112 to generate an analog signal corresponding to the data DATA. In example embodiments, the source driver 112 may generate a data signal through a method of interpolating the plurality of gamma voltages (VG1, VG2, . . . , VGi) (hereinafter referred to as an interpolation scheme). For example, the gamma voltage generator 113 may provide 64 gamma voltages to the source driver 112. In order to convert the data DATA for expressing 1024 ($2^{10}$) grayscales into a data signal, the source driver 112 may use high-order bits (MSB 6 bit) data of the data DATA to select two gamma voltages among 64 ($2^6$) gamma voltages, and may use data of low-order bits (LSB 4 bit) to divide voltages between two gamma voltages selected by using the data of the high-order bits into 16 ($2^4$) steps to output them. In this interpolation scheme, a voltage difference may occur between an actual voltage outputted according to each low-order bit data value and an ideal voltage to be outputted, due to integral nonlinearity (INL).

The driving controller 114 may receive the image data IS and a driving control signal CTRL from a host device, and may control the gate driver 111, the source driver 112, and the gamma voltage generator 113. Here, the host device may be a computing device or system that controls the display device 100 to display an image desired by a user on the display panel 120. The driving control signal CTRL provided from the host device may include control instructions and predetermined data for controlling the gate driver 111, the source driver 112, and the gamma voltage generator 113. For example, the driving control signal CTRL may include an instruction (hereinafter referred to as a 'brightness control instruction') for controlling brightness of the display device 100, an instruction (hereinafter referred to as an 'operation mode control instruction') for instructing an operation mode of the display device 100, and data (hereinafter referred to as 'temperature data') for indicating a temperature of the display device 100 or a temperature around the display device 100. For example, the display device 100 or an external device may include a thermometer to obtain the temperature data. The driving controller 114 may display the same image data IS with different luminance on the display panel 120 according to the brightness control instruction. For example, when the brightness control instruction indicates a first brightness, the driving controller 114 may display 243 grayscale image data IS with a first luminance, and when the brightness control instruction indicates a second brightness, the driving controller 114 may display the 243 grayscale image data IS with a second luminance higher than the first luminance. The driving controller 114 of the driving control signal may control the gate driver 111, the source driver 112, and the gamma voltage generator 113 based on the driving control signal CTRL. For example, the driving control signal CTRL may include a horizontal synchronization signal Hsync, a vertical synchronization signal Vsync, a main clock signal MCLK, and a data enable signal DE. The driving controller 114 may divide the image data IS in units of one frame based on the vertical sync signal Vsync, and may divide the image data IS in units of the gate lines GL based on the horizontal sync signal Hsync to generate the data DATA. The driving controller 114 may transmit a gate driver control signal CONT1 and the source driver control signal CONT2 to the gate driver 111 and the source driver 112 to perform, for example, control to synchronize operations of the source driver 112 and the gate driver 111. The driving controller 114 may transmit a gamma voltage generation control signal CONT3 to the gamma voltage generator 113 to control an operation of the gamma voltage generator 113. The driving controller 114 may control the gate driver 111, the source driver 112, and the gamma voltage generator 113 based on a control instruction that is self-generated independently from the driving control signal CTRL received from the host device or in addition to the driving control signal CTRL.

The driving controller 114 may include an offset compensation circuit 115 for compensating for an offset of the source driver 112. The offset compensation circuit 115 may generate gamma image data by converting a gamma characteristic of the image data IS. In example embodiments, the offset compensation circuit 115 may compensate the image data IS or gamma image data in which the image data IS is gamma-corrected, by using a compensation value corresponding to the offset. For example, the offset compensation circuit 115 may add or subtract a compensation value to or from the image data IS or gamma image data. Hereinafter, the offset compensation circuit 115 will be described as compensating for the gamma image data.

In some example embodiments, the offset compensation circuit 115 may compensate for the gamma image data by selecting at least one of compensation values stored in a look-up table (LUT) format. The LUT may include a plurality of compensation values corresponding to a plurality of low-order bit data values of the gamma image data.

In example embodiments, the LUT may include a plurality of groups, each group may include a plurality of taps, and each tap may include a plurality of compensation values corresponding to a plurality of low-order bit data values. Specifically, the LUT may include groups in which a plurality of compensation values corresponding to a plurality of low-order bit data values of the gamma image data are divided according to brightness of the display device 100. For example, the LUT may include a first group including a plurality of compensation values corresponding to a first brightness and a second group including a plurality of compensation values corresponding to a second brightness, and in this case, a plurality of compensation values included in each group may correspond to a plurality of low-order bit data values of the gamma image data. The LUT may include groups in which a plurality of compensation values corresponding to a plurality of low-order bit data values of the gamma image data are divided for each operation mode of the display device 100. For example, the LUT may include a first group including a plurality of compensation values corresponding to a first operation mode and a second group including a plurality of compensation values corresponding to a second operation mode, and in this case, a plurality of compensation values included in each group may correspond to a plurality of low-order bit data values of the gamma image data. That is, within different groups divided by the brightness or operation mode, compensation values corresponding to low-order bit data values of the same gamma image data may be different from each other. The LUT may include a plurality of taps in which a plurality of compensation values corresponding to a plurality of low-order bit data values of the gamma image data are divided for each high-order bit data value. For example, the LUT may include a first tap including a plurality of compensation values corresponding to a first value and a second tap including a plurality of compensation values corresponding to a second value, and in this case, a plurality of compensation values included in each tap may correspond to a plurality of low-order bit data values of the gamma image data. That is, in the case of different taps, compensation values corresponding to the same low-order bit data value may be different from each other.

The offset compensation circuit 115 may correct a plurality of compensation values. In example embodiments, the offset compensation circuit 115 may interpolate the compensation values stored in an LUT. The offset compensation circuit 115 may calculate a plurality of compensation values corresponding to a plurality of low-order bit data values in a third brightness corresponding to an intermediate brightness between a first brightness and a second brightness of the display device 100 not included in the LUT, by interpolating a plurality of compensation values corresponding to a plurality of low-order bit data values in a first brightness of the display device 100 included in the LUT and a plurality of compensation values corresponding to a plurality of low-order bit data values in a second brightness of the display device 100 included in the LUT. The offset compensation circuit 115 may calculate a plurality of compensation values corresponding to a plurality of low-order bit data values when a high-order bit data value not included in the LUT is a third value corresponding to an intermediate value between a first value and a second value, by interpolating a plurality of compensation values corresponding to a plurality of low-order bit data values when the high-order bit data value included in the LUT is the first value and a plurality of compensation values corresponding to a plurality of low-order bit data values when the high-order bit data value included in the LUT is the second value.

In example embodiments, the offset compensation circuit 115 may compensate the compensation values included in the LUT by using temperature data. The offset compensation circuit 115 may apply a gain value and an offset value according to a temperature value determined by using the temperature data to the compensation values included in the LUT. For example, the offset compensation circuit 115 may multiply a gain value corresponding to a temperature value by compensation values included in the LUT, and may subtract or add an offset value corresponding to the temperature value.

In some example embodiments, the offset compensation circuit 115 may compensate the compensation values by selecting one or more of a plurality of gain values and a plurality of offset values stored in the LUT. In example embodiments, the LUT may include a plurality of gain values and a plurality of offset values corresponding to a plurality of temperature values. The LUT may include the plurality of gain values and the plurality of offset values corresponding to the temperature value by classifying them according to the brightness of the display device 100. For example, when the brightnesses of the display device 100 are different, a plurality of gain values and a plurality of offset values corresponding to the same temperature value may be different from each other. The LUT may include the plurality of gain values and the plurality of offset values corresponding to the temperature value by classifying them for each operation mode of the display device 100. For example, when the operation modes of the display device 100 are different, a plurality of gain values and a plurality of offset values corresponding to the same temperature value may be different from each other. The LUT may include the plurality of gain values and the plurality of offset values corresponding to the temperature value by classifying them for each high-order bit data value. For example, when the high-order bit data values of the gamma image data are different, a plurality of gain values and a plurality of offset values corresponding to the same temperature value may be different from each other.

The offset compensation circuit 115 may interpolate the plurality of gain values and the plurality of offset values stored in the LUT. The offset compensation circuit 115 may calculate a plurality of gain values and a plurality of offset values corresponding to a plurality of temperature values in a third brightness corresponding to an intermediate brightness between a first brightness and a second brightness of the display device 100 that are not included in the LUT, by interpolating a plurality of gain values and a plurality of offset values corresponding to a plurality of temperature values in a first brightness of the display device 100 included in the LUT and a plurality of gain values and a plurality of offset values corresponding to a plurality of temperature values in a second brightness of the display device 100 included in the LUT. The offset compensation circuit 115 may calculate a plurality of gain values and a plurality of offset values corresponding to a plurality of temperature values when a high-order bit data value not included in the LUT is a third value corresponding to an intermediate value between a first value and a second value, by interpolating a plurality of gain values and a plurality of offset values corresponding to a plurality of temperature values when a high-order bit data value included in the LUT is the first value and a plurality of gain values and a plurality of offset values corresponding to a plurality of temperature values when a high-order bit data value included in the LUT is the second value. The offset compensation circuit 115 may calculate a plurality of gain values and a plurality of offset values at a third temperature value corresponding to an intermediate temperature value between a first temperature value and a second temperature value not included in the LUT, by interpolating a plurality of gain values and a plurality of offset values at a first temperature value included in the LUT and a plurality of gain values and a plurality of offset values at a second temperature value included in the LUT.

The display driving circuit 110 of example embodiments may compensate for gamma image data, so that the INL of the source driver 112 may be reduced. In addition, because the display driving circuit 110 according to example embodiments may determine the degree of compensation of the gamma image data according to the operation mode and temperature of the display device 100, the INL of the source driver 112 may be further reduced. Therefore, according to the display driving circuit 110 according to example embodiments, a color coordinate error may be reduced. In addition, because the display driving circuit 110 according to example embodiments interpolates and uses the compensation values, the compensation values used for compensation may be stored even with a small storage capacity.

Figure 2:
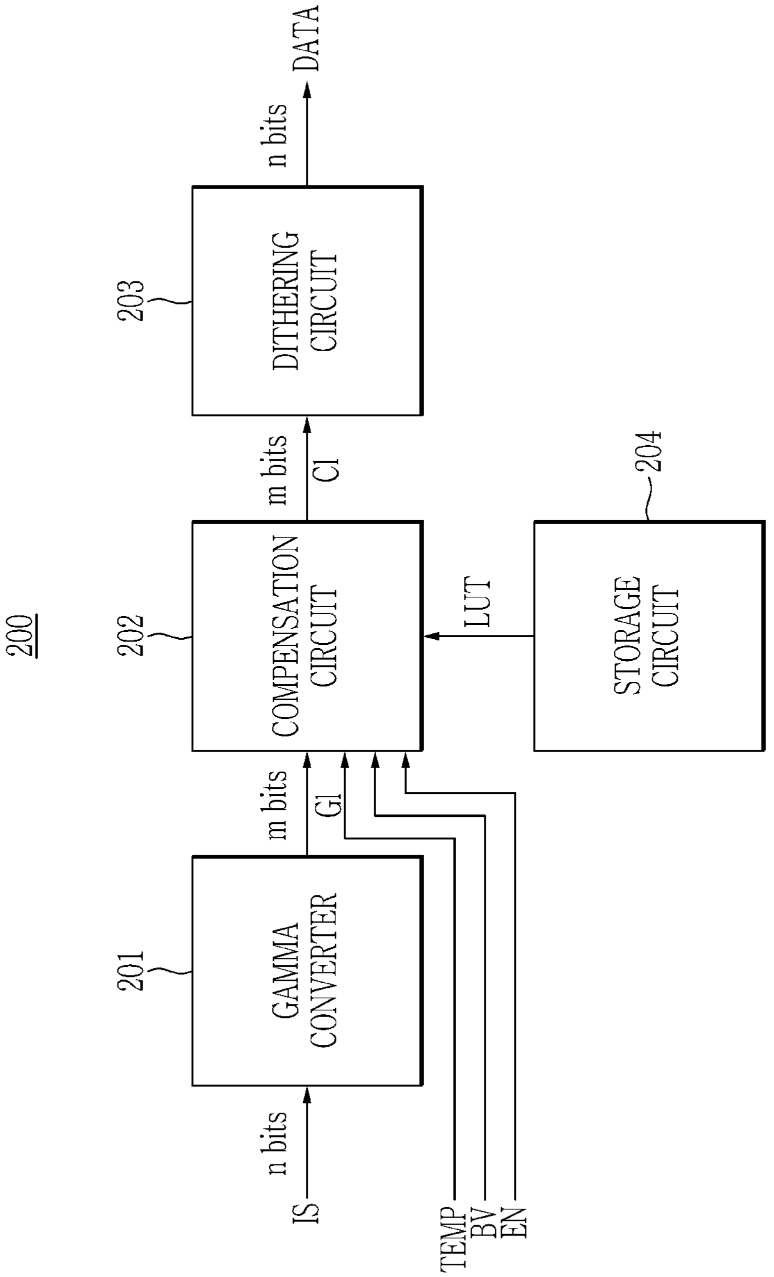
FIG. 2 illustrates a block diagram of a semiconductor device according to an example embodiment.

FIG. 2 illustrates a block diagram of a semiconductor device according to an example embodiment.

Referring to FIG. 2, a semiconductor device 200 may include a gamma converter 201, a compensation circuit 202, a dithering circuit 203, and a storage circuit 204. The semiconductor device 200 may be the offset compensation circuit 115 of FIG. 1.

The gamma converter 201 may gamma-correct the image data IS. For example, the gamma converter 201 may convert the image data IS to fit a specific gamma curve. In example embodiments, the gamma converter 201 may receive an n-bit unit of image data IS (n is a natural number greater than or equal to 2, for example, n=10) and convert a gamma characteristic of the image data IS to fit a gamma 2.2 curve, and may output an m-bit unit of gamma image data GI (m is a natural number greater than or equal to 2, m>n, for example, m=14) in which the gamma characteristic is converted. The gamma converter 201 may perform gamma conversion by using an LUT for gamma conversion or by using an equation for gamma conversion. For example, the LUT for gamma conversion may include data mapped for each grayscale. The gamma converter 201 may search for data corresponding to the input image data IS from the LUT, and may output the searched data as gamma image data GI. Here, the number of unit bits of the gamma image data GI may be larger than the number of unit bits of the image data IS, which may allow for increased precision of gamma conversion. For example, the gamma converter 201 may output the gamma image data GI of the m-bit unit with respect to the image data IS of the n-bit unit.

The compensation circuit 202 may compensate the gamma image data GI to output compensated gamma image data CI. The compensation circuit 202 may read the LUT stored in the storage circuit 204, and compensate the gamma image data GI by using a plurality of compensation values stored in the LUT. The compensation circuit 202 may use one of temperature data, an operation mode control instruction, and a brightness control instruction to interpolate a plurality of compensation values.

An operation of the compensation circuit 202 will be described with reference to FIG. 3 and FIG. 4 together.

Figure 3:
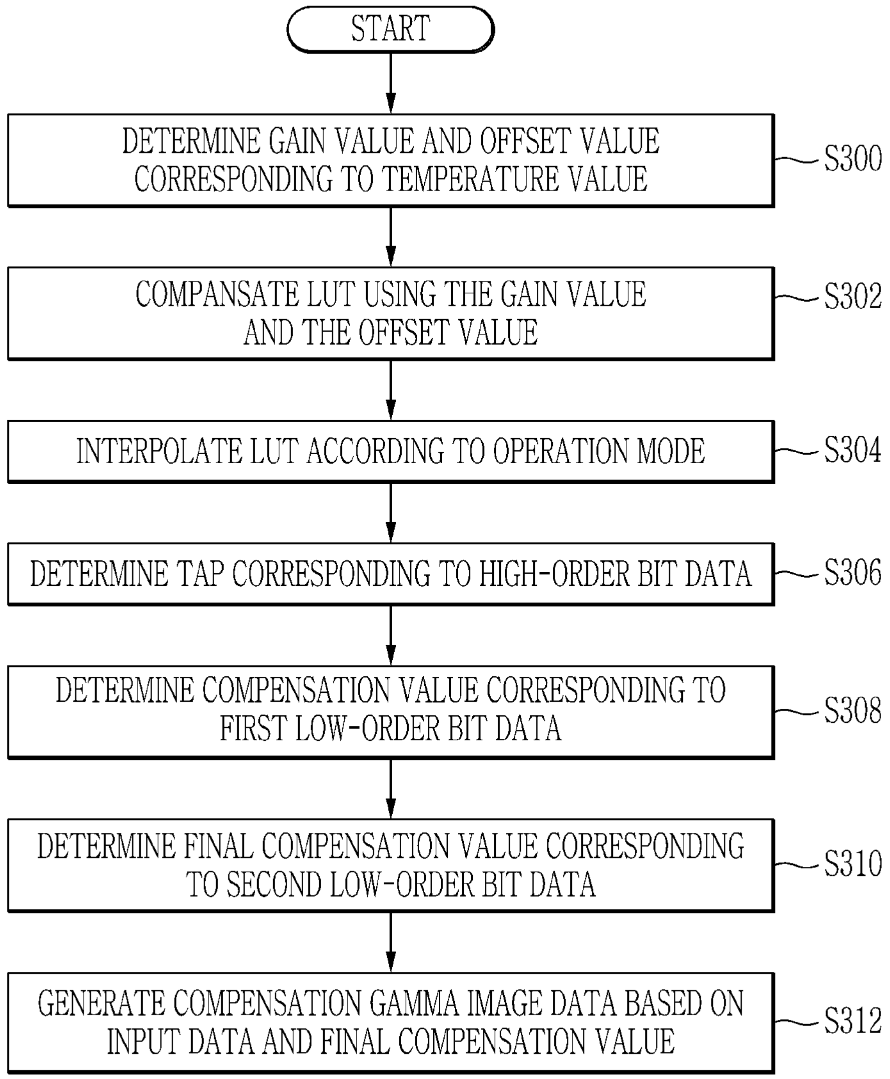
FIG. 3 illustrates a flowchart of an operation method of a semiconductor device according to an example embodiment.

FIG. 3 illustrates a flowchart of an operation method of a semiconductor device according to an example embodiment, and FIG. 4 illustrates an LUT stored in a semiconductor device according to an example embodiment.

Referring to FIG. 3, the compensation circuit 202 may determine a gain value and an offset value corresponding to a temperature value of temperature data TEMP (operation S300). The compensation circuit 202 may read the gain value and the offset value corresponding to the temperature value of the temperature data TEMP from the LUT. As shown in FIG. 4, an LUT 400 may include a plurality of gain values GAIN and a plurality of offset values OFFSET corresponding to a temperature value (LOW, MID, or HIGH). For example, the LUT 400 may include a plurality of gain values GAIN and a plurality of offset values OFFSET corresponding to the temperature value LOW. The plurality of gain values GAIN and the plurality of offset values OFFSET may be divided according to brightnesses MODE0 and MODE1 that may be set by a brightness control instruction and an operation mode control instruction MODE2. In addition, the plurality of gain values GAIN and the plurality of offset values OFFSET may be distinguished according to a high-order bit data value (GI[13:8]) even within the same group MODE0, MODE1, or MODE2.

The compensation circuit 202 may read a plurality of gain values and a plurality of offset values corresponding to the temperature value LOW, MID, or HIGH of the LUT that matches the temperature value of the temperature data TEMP from the LUT. When the temperature value of the temperature data TEMP is different from the temperature values LOW, MID, and HIGH of the LUT, the compensation circuit 202 may interpolate the plurality of gain values and the plurality of offset values, by using two temperature values between which the temperature values of the temperature data TEMP are positioned among the temperature values LOW, MID, and HIGH of the LUT. For example, when the temperature value of the temperature data TEMP is 52 degrees, and when the temperature value of LOW of the LUT is 35 degrees, the temperature value of MID of the LUT is 50 degrees, and the temperature value of HIGH of the LUT is 62 degrees, the temperature value of the temperature data TEMP is positioned between MID and HIGH. The compensation circuit 202 may calculate a plurality of gain values and a plurality of offset values corresponding to 52 degrees by interpolating a plurality of gain values and a plurality of offset values corresponding to MID and HIGH, respectively.

The compensation circuit 202 may compensate the LUT by using the plurality of gain values and the plurality of offset values (operation S302). The compensation circuit 202 may compensate the LUT by applying a gain value and an offset value corresponding to the temperature value of the temperature data TEMP to a plurality of compensation values. As shown in FIG. 4, the LUT 400 may include a plurality of groups 401, 402, and 403 of which compensation values are divided by operation modes MODE1, MODE2, and MODE3. The compensation values of the LUT 400 may be mapped to low-order data values GI[7:4] (0000, . . . , 1111). The compensation values of the LUT 400 may be predetermined bit data that may be expressed with a sign. For example, the compensation values may be 5-bit data. In FIG. 4, the compensation value is described as an integer for reference. The compensation circuit 202 may multiply the compensation values by the gain value GAIN corresponding to the temperature value, and may add the offset value OFFSET corresponding to the temperature value.

The compensation circuit 202 may determine a group corresponding to the operation mode in the compensated LUT. When an operation mode control instruction EN is received, the compensation circuit 202 may determine to use compensation values of the operation mode group MODE2 indicated by the operation mode control command EN among a plurality of compensation values included in the compensated LUT. When the operation mode control instruction EN is not received, the compensation circuit 202 may determine to use compensation values of the groups 401 or 402 associated with the modes MODE0 or MODE1 corresponding to brightness (first brightness or second brightness) set according to a brightness control instruction BV among a plurality of compensation values included in the compensated LUT. The compensation circuit 202 may interpolate the two groups 401 and 402 when the brightness set according to the brightness control instruction is between the first brightness and the second brightness, and determine to use the interpolated LUT. Here, the operation mode according to the operation mode control instruction EN may be a low-power display mode such as an AMOLED low power mode (ALPM) or a hybrid low power mode (HLPM), but is not limited thereto.

The compensation circuit 202 may determine a tap corresponding to a high-order bit data value (GI[13:8]) (operation S306). The compensation circuit 202 may determine a tap TAP0, TAP1, or TAP2 corresponding to the high-order bit data value (GI[13:8]) of the gamma image data GI. As shown in FIG. 4, the plurality of groups 401, 402, and 403 may each include a plurality of taps TAP0, TAP1, and TAP2 divided according to the high-order bit data value (GI[13:8]). That is, each of the plurality of taps TAP0, TAP1, and TAP2 may correspond to one high-order bit data value (GI[13:8]). For example, when the high-order bit is 6 bits, each of the plurality of taps TAP0, TAP1, and TAP2 may correspond to a data value between 000000 and 111111. Respective compensation values of the plurality of taps TAP0, TAP1, and TAP2 may be mapped to low-order data values GI[7:4] (0000, . . . , 1111). The LUT interpolated in operation S304 may also include the plurality of taps TAP0, TAP1, and TAP2.

When the high-order bit data value (GI[13:8]) of the gamma image data GI is different from the values of the plurality of taps TAP0, TAP1, and TAP2, the compensation circuit 202 may interpolate a plurality of compensation values, by using two tap values between which the high-order bit data (GI[13:8]) of the gamma image data GI is positioned among the values of the plurality of taps TAP0, TAP1, and TAP2. For example, when the value of the high-order bit data (GI[13:8]) of the gamma image data GI is 001111, and when the values of TAP0 of the plurality of taps TAP0, TAP1, and TAP2 are 001000, the values of TAP1 of the plurality of taps TAP0, TAP1, and TAP2 is 100000, and the values of TAP2 of the plurality of taps TAP0, TAP1, and TAP2 is 111000, the high-order bit data value (GI[13:8]) is positioned between TAP0 and TAP1. The compensation circuit 202 may interpolate a plurality of compensation values included in each of TAP0 and TAP1.

The compensation circuit 202 may select a compensation value corresponding to the first low-order bit data value (GI[7:4]) (operation S308). The compensation circuit 202 may select a compensation value corresponding to a first low-order bit data value (GI[7:4]) of the gamma image data GI from the plurality of compensation values of the determined tap. The compensation circuit 202 may select a compensation value corresponding to the first low-order bit data value (GI[7:4]) of the gamma image data GI, and a compensation value corresponding to a value adjacent to the first low-order bit data value (GI[7:4]). For example, when the first low-order bit data (GI[7:4]) of the gamma image data GI is '1000', the compensation circuit 202 may select a compensation value corresponding to ‘1000’, a compensation value corresponding to ‘0111’, and a compensation value corresponding to ‘1001’, in the plurality of compensation values of the determined tap. When the first low-order bit data (GI[7:4]) of the gamma image data GI is ‘1111’, the compensation circuit 202 may select a compensation value corresponding to ‘1110’ in the plurality of compensation values of the determined tap.

The compensation circuit 202 may determine a final compensation value corresponding to the second low-order bit data (GI[3:0]) (operation S310). The compensation circuit 202 may determine the final compensation value by using the selected plurality of compensation values. For example, the compensation circuit 202 may interpolate the selected plurality of compensation values by using the second low-order bit data value (GI[3:0]). For example, by using a compensation value corresponding to ‘1000’, a compensation value corresponding to ‘0111’, and a compensation value corresponding to ‘1001’ in the values selected when the first low-order bit data (GI[7:4]) of the gamma image data GI is ‘1000’, it is possible to generate an interpolation function, and it is possible to input the second low-order bit data (GI[3:0]) to a linear interpolation function to determine the final compensation value.

The compensation circuit 202 may generate compensated gamma image data CI by compensating the final compensation value for the gamma image data GI (operation S312). The compensation circuit 202 may generate the compensated gamma image data CI by adding the final compensation value to the gamma image data GI. When the compensated gamma image data CI is expressed by more bits (for example, m+1 bits) than m bits, the compensation circuit 202 may clip the compensated gamma image data CI to change the clipped data as data of m bits.

In example embodiments, the compensation circuit 202 may perform only some of operations (operations S300, S302, . . . , S312). For example, the compensation circuit 202 may perform operations S306, S308, S310, and S12 on the gamma image data GI without performing operations S300, S302, and S304. In addition, the compensation circuit 202 may perform operations S304, S306, S308, S310, and S12 on the gamma image data GI without performing operations S300 and S302.

The dithering circuit 203 may perform temporal and/or spatial dithering on the compensated gamma image data CI. The dithering circuit 203 may output data DATA of n bits by performing a dithering process on the compensated gamma image data CI of m bits.

Figure 5:
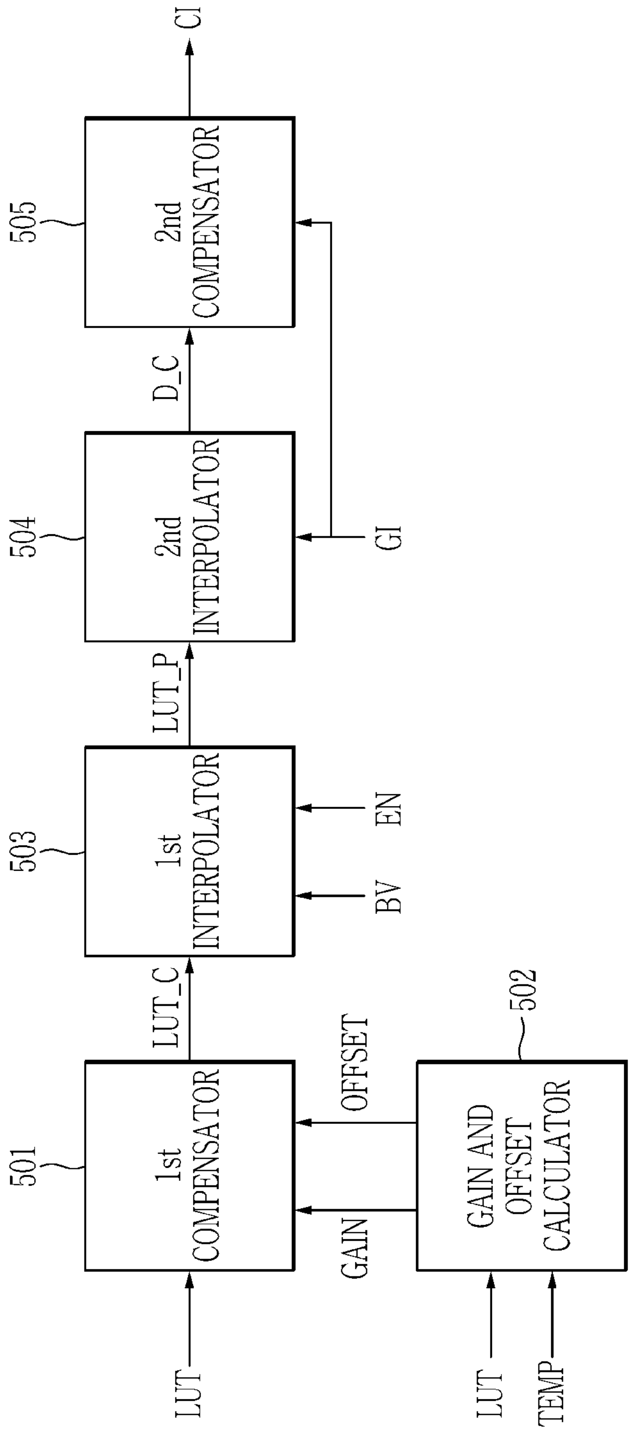
FIG. 5 illustrates a block diagram of a compensation circuit of a semiconductor device according to an example embodiment.

FIG. 5 illustrates a block diagram of a compensation circuit of a semiconductor device according to an example embodiment.

Referencing to FIG. 5, a compensation circuit 500 according to an example embodiment may include a first compensator 501, a gain and offset calculator 502, a first interpolator 503, a second interpolator 504, and a second compensator 505.

The first compensator 501 may read the LUT from the storage circuit 204 of FIG. 2. The first compensator 501 may generate a compensation LUT (LUT_C) by compensating a plurality of compensation values of the LUT according to a temperature. The first compensator 501 may compensate the LUT by using the gain value GAIN and the offset value OFFSET transmitted from the gain and offset calculator 502. The first compensator 501 may receive a plurality of gain values GAIN and a plurality of offset values OFFSET corresponding to the plurality of compensation values. To obtain the compensation LUT (LUT_C), the first compensator 501 may compensate the plurality of compensation values by multiplying a corresponding at least one of the plurality of compensation values by a corresponding gain value GAIN of the plurality of gain values GAIN and adding a corresponding offset value OFFSET of the plurality of offset values OFFSET to a corresponding at least one of the plurality of compensation values.

The gain and offset calculator 502 may read the LUT from the storage circuit 204 of FIG. 2. The gain and offset calculator 502 may receive the temperature data TEMP, which may indicate a temperature sensed by a thermometer. The gain and offset calculator 502 may determine the plurality of gain values GAIN and the plurality of offset values OFFSET corresponding to the temperature value of the temperature data TEMP by using the LUT.

In example embodiments, the LUT may include a plurality of gain values GAIN and a plurality of offset values OFFSET corresponding to a plurality of temperature values. The gain and offset calculator 502 may interpolate the plurality of gain values GAIN and the plurality of offset values OFFSET stored in the LUT so as to determine the plurality of gain values GAIN and the plurality of offset values OFFSET corresponding to the temperature value of the temperature data TEMP. This will be described with reference to FIG. 6.

Figure 6:
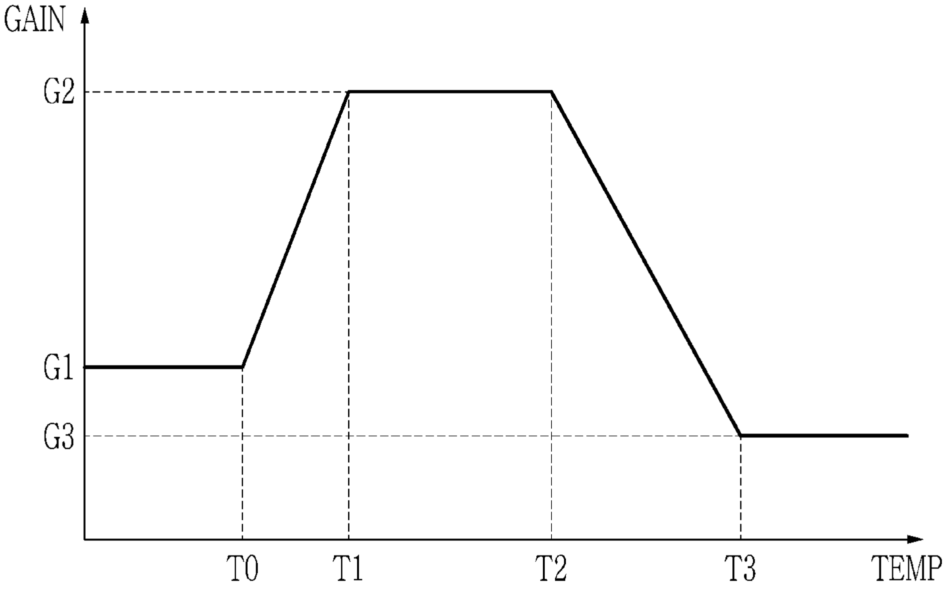
FIG. 6 illustrates a graph of an LUT compensation gain value according to a temperature of a semiconductor device according to an example embodiment.

FIG. 6 illustrates a graph of an LUT compensation gain value according to a temperature of a semiconductor device according to an example embodiment.

Referring to FIG. 6, the LUT may store gain values G1, G2, G2, and G3 in association with corresponding temperature values T0, T1, T2, and T3. The gain and offset calculator 502 may determine the gain value GAIN as G1 when the temperature value of the temperature data TEMP is T0 or less. When the temperature value of the temperature data TEMP is greater than T0 and less than T1, the gain and offset calculator 502 may determine the gain value GAIN by interpolating between G1 and G2 according to the temperature value. The gain and offset calculator 502 may determine the gain value GAIN as G2 when the temperature value is greater than or equal to T1 and less than or equal to T2. When the temperature value is greater than T2 and less than T3, the gain and offset calculator 502 may determine the gain value GAIN by interpolating between G2 and G3 according to the temperature value. The gain and offset calculator 502 may determine the gain value GAIN as G3 when the temperature value of the temperature data TEMP is greater than or equal to T3. The method described herein is only one example of several methods in which the gain and offset calculator 502 may determine the gain value GAIN according to the temperature value of the temperature data TEMP, and the gain and offset calculator 502 may use a different method to determine the gain value GAIN according to the temperature value of the temperature data TEMP.

The gain and offset calculator 502 may compensate the LUT by using the determined gain value GAIN and offset value OFFSET. The compensation LUT (LUT_C) may include a plurality of compensation values compensated by the gain value GAIN and the offset value OFFSET. The plurality of compensation values in the compensation LUT (LUT_C) may include groups divided by brightness and groups divided by operation mode, in the same manner as in the LUT before compensation.

In an example embodiment, the LUT may store a functional model of the plurality of gain values GAIN and/or the plurality of offset values OFFSET according to the temperature value. The gain and offset calculator 502 may determine a plurality of gain values GAIN and a plurality of offset values OFFSET corresponding to the temperature value of the temperature data TEMP by using the function model.

The first interpolator 503 may determine a group corresponding to the operation mode in the compensation LUT (LUT_C). The first interpolator 503 may determine to use a compensation value of a group corresponding to the operation mode control instruction EN and the brightness control instruction By. The first interpolator 503 may generate a group corresponding to the brightness of the brightness control instruction BV by interpolating the compensation value stored in the compensation LUT (LUT_C). Group selection and interpolation operations of the first interpolator 503 will be described with reference to FIG. 7.

Figure 7:
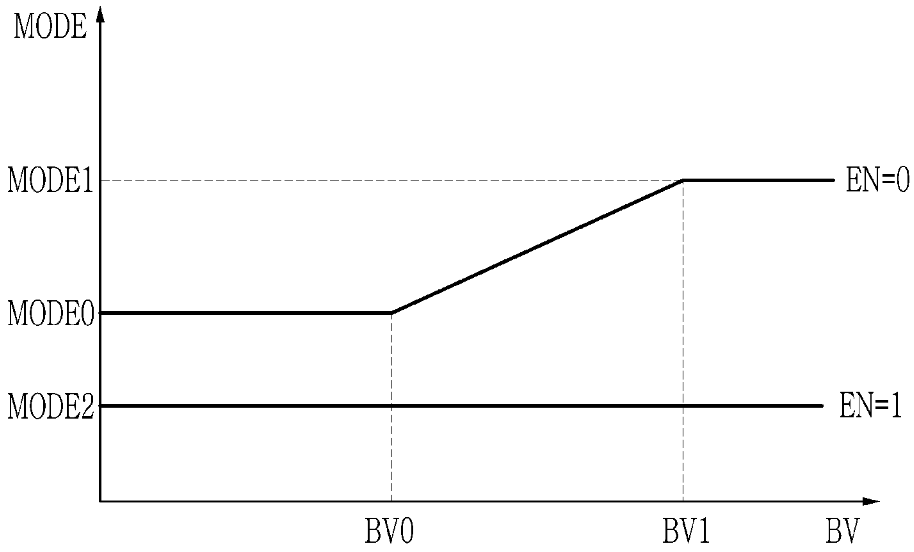
FIG. 7 illustrates a graph of a group selected according to brightness and an operation mode of a semiconductor device according to an example embodiment.

FIG. 7 illustrates a graph of a group selected according to brightness and an operation mode of a semiconductor device according to an example embodiment.

The first interpolator 503 may determine to use the compensation value of the group MODE2 in the compensation LUT (LUT_C) when the operation mode control instruction EN is enabled ("EN=1").

When the operation mode control instruction EN is disabled ("EN=0"), the first interpolator 503 may use the compensation value of the group MODE0 and a value in which the compensation value of the group MODE1 is interpolated according to a compensation or brightness value of the group MODE0 or MODE1 corresponding to the brightness value of the brightness control instruction By.

The compensation LUT (LUT_C) may include a group MODE0 corresponding to brightness BV0 and a group MODE1 corresponding to brightness BV1. Each of the group MODE0 and the group MODE1 may include a plurality of compensation values. When the brightness of the brightness instruction BV is equal to or less than BV0, the first interpolator 503 may determine to use the compensation values of the group MODE0. When the brightness of the brightness instruction BV is equal to or greater than BV1, the first interpolator 503 may determine to use the compensation values of the group MODE1. When the brightness of the brightness instruction BV is greater than BV0 and less than BV1, the first interpolator 503 may interpolate and determine a value between the compensation values of the group MODE0 and compensation values of the group MODE1 according to brightness. The method described herein is only one example of several methods in which the first interpolator 503 may determine a group according to the operation mode and brightness, and the first interpolator 503 may determine a group according to the operation mode and brightness in a different way.

The first interpolator 503 may output an LUT (LUT_P) including a plurality of compensation values of the determined group or a plurality of the interpolated compensation values.

The second interpolator 504 may determine a tap corresponding to the high-order bit data of the gamma image data GI by using the LUT (LUT_P).

The second interpolator 504 may determine to use a compensation value of the tap corresponding to the high-order bit data value. The second interpolator 504 may generate the tap corresponding to the high-order bit data value by interpolating the compensation value stored in the LUT (LUT_P). Tap selection and interpolation operations of the second interpolator 504 will be described with reference to FIG. 8.

Figure 8:
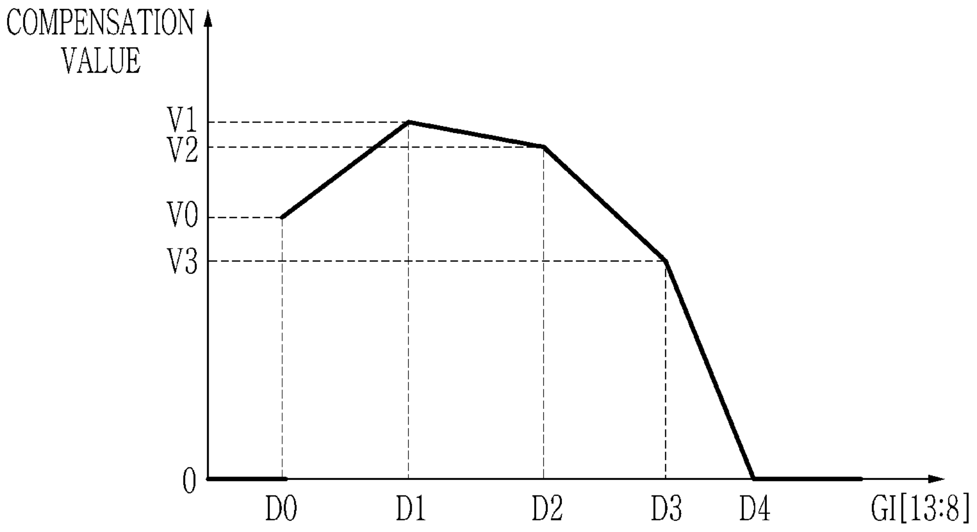
FIG. 8 illustrates a graph of compensation values according to high-order bits of image data of a semiconductor device according to an example embodiment.

FIG. 8 illustrates a graph of compensation values according to high-order bits of image data of a semiconductor device according to an example embodiment.

Referring to FIG. 8, the LUT (LUT_P) may store compensation values corresponding to D0, D1, D2, D3, and D4 that are the high-order bit data values (GI[13:8]) as V0, V1, V2, V3, and 0. In this case, the compensation value is a compensation value corresponding to the same low-order bit data value. The second interpolator 504 may determine the compensation value as 0 when the high-order bit data value (GI[13:8]) is less than D0. The second interpolator 504 may determine the compensation value as V0 when the high-order bit data value (GI[13:8]) is D0. The second interpolator 504 may determine the compensation value by interpolating between V0 and V1 according to the high-order bit data value (GI[13:8]) when the high-order bit data value (GI[13:8]) is greater than D0 and less than D1. The second interpolator 504 may determine the compensation value as V2 when the high-order bit data value (GI[13:8]) is D2. The second interpolator 504 may determine the compensation value by interpolating between V2 and V3 according to the high-order bit data value (GI[13:8]) when the high-order bit data value (GI[13:8]) is greater than D2 and less than D3. The second interpolator 504 may determine the compensation value as V3 when the high-order bit data value (GI[13:8]) is D3. The second interpolator 504 may determine the compensation value by interpolating between V3 and 0 according to the high-order bit data value (GI[13:8]) when the high-order bit data value (GI[13:8]) is greater than D3 and less than D4. The second interpolator 504 may determine the compensation value as 0 when the high-order bit data value (GI[13:8]) is equal to or greater than D4. The method described herein is only one example of several methods in which the second interpolator 504 may determine a tap according to the high-order bit data value, and the second interpolator 504 may determine a tap according to the high-order bit data value in a different way.

The second interpolator 504 may output a plurality of compensation values of the determined tap or a plurality of the interpolated compensation values as compensation data D_C.

The second compensator 505 may determine a final compensation value CI corresponding to the low-order bit data of the gamma image data GI by using the compensation data D_C. In example embodiments, the second compensator 505 may determine the final compensation value by interpolating compensation values corresponding to the values of the first low-order bit data (GI[7:4]) by using the values of the second low-order bits data (GI[3:0]). For example, the second compensator 505 may generate an interpolation function using the second low-order bit data (GI[3:0]) as an input value and the compensation value as an output value, by using a compensation value corresponding to the first low-order bit data (GI[7:4]) value among the plurality of compensation values of the compensation data D_C and at least one compensation value corresponding to a value adjacent to the first low-order bit data (GI[7:4]) value. The second compensator 505 may output an output value according to the second low-order bit data (GI[3:0]) of the gamma image data GI in the generated interpolation function as the final compensation value.

In example embodiments, the compensation circuit 500 includes only some of the first compensator 501, the gain and offset calculator 502, the first interpolator 503, the second interpolator 504, and the second compensator 505. For example, the compensation circuit 500 may include only the second interpolator 504 and the second compensator 505. Alternatively, the compensation circuit 202 may include only the first interpolator 503, the second interpolator 504, and the second compensator 505.

Figure 9:
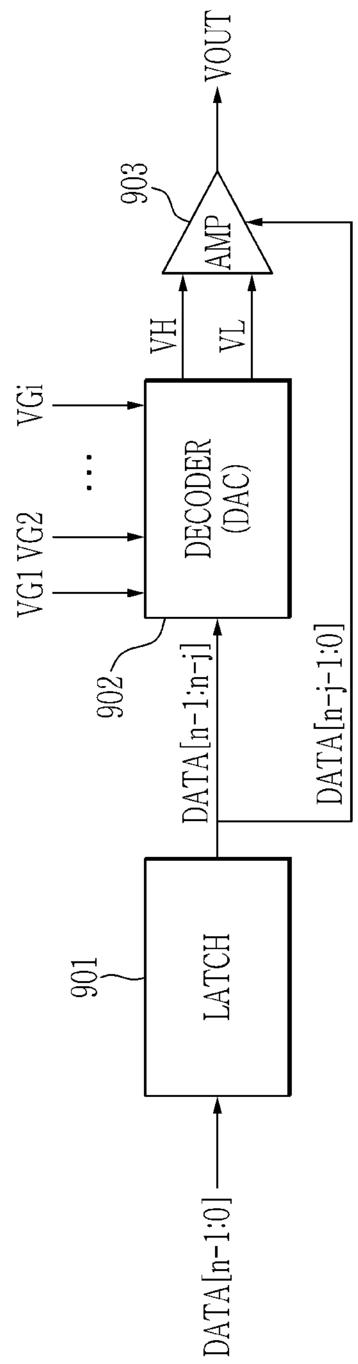
FIG. 9 illustrates a schematic block diagram of a source driver according to an example embodiment.

FIG. 9 illustrates a schematic block diagram of a source driver according to an example embodiment.

Referring to FIG. 9, a source driver 900 may include a latch 901, a decoder 902, and a source amplifier 903.

The latch 901 may temporarily store received data (DATA [n−1:0]), may dispose it to fit a source line of the display panel (120 in FIG. 1), and may transmit the disposed data to the decoder 902.

The decoder 902 may receive high-order bit data (DATA [n−1:nj]) of the data disposed by the latch 901, and may convert the high-order bit data (DATA[n−1:nj]) into an analog signal. The decoder 902 may output two gamma voltages VH and VL corresponding to the high-order bit data (DATA[n−1:nj]) of j-bit among a plurality of gamma voltages (VG1, VGi) received from the gamma voltage generator (113 in FIG. 1). The two gamma voltages VH and VL may be inputted to the source amplifier 903.

The source amplifier 903 may receive the low-order bit data (DATA[nj−1:0]) of the data disposed by the latch 901, and may generate and output an interpolation voltage between the two gamma voltages VH and VL based on the low-order bit data (DATA[nj−1:0]). The source amplifier 903 may use n-j bits of low-order bit data (DATA[n−j−1:0]) based on the two gamma voltages VH and VL to output $2^{n-j}$ interpolation voltages as an output signal VOUT. That is, the source amplifier 903 may output one of the $2^{n-j}$ interpolation voltages corresponding to the low-order bit data (DATA[n−j−1:0]) as the output signal VOUT. The output signal VOUT may be transmitted to the display panel 120 as data signals (S1, S2, . . . , Sk of FIG. 1) in a form of an analog signal.

A difference between the output signal VOUT that is outputted according to the low-order bit data value (DATA [n−j−1:0]) by the INL of the source amplifier 903 and an ideal signal that should be outputted according to the low-order bit data value (DATA[n−j−1:0]) may occur.

According to example embodiments, a compensation value capable of compensating for such a difference is stored in the LUT, and the compensation value stored in the LUT is compensated and/or interpolated in consideration of the temperature, brightness, and mode of the display device, so that the output signal VOUT having a reduced voltage difference may be outputted.

The output signal VOUT outputted based on a plurality of gamma voltages (VG1, . . . , VGi) and data (DATA[n−1:0]) received by the source driver 900 will be described with reference to FIG. 10 together.

Figure 10:
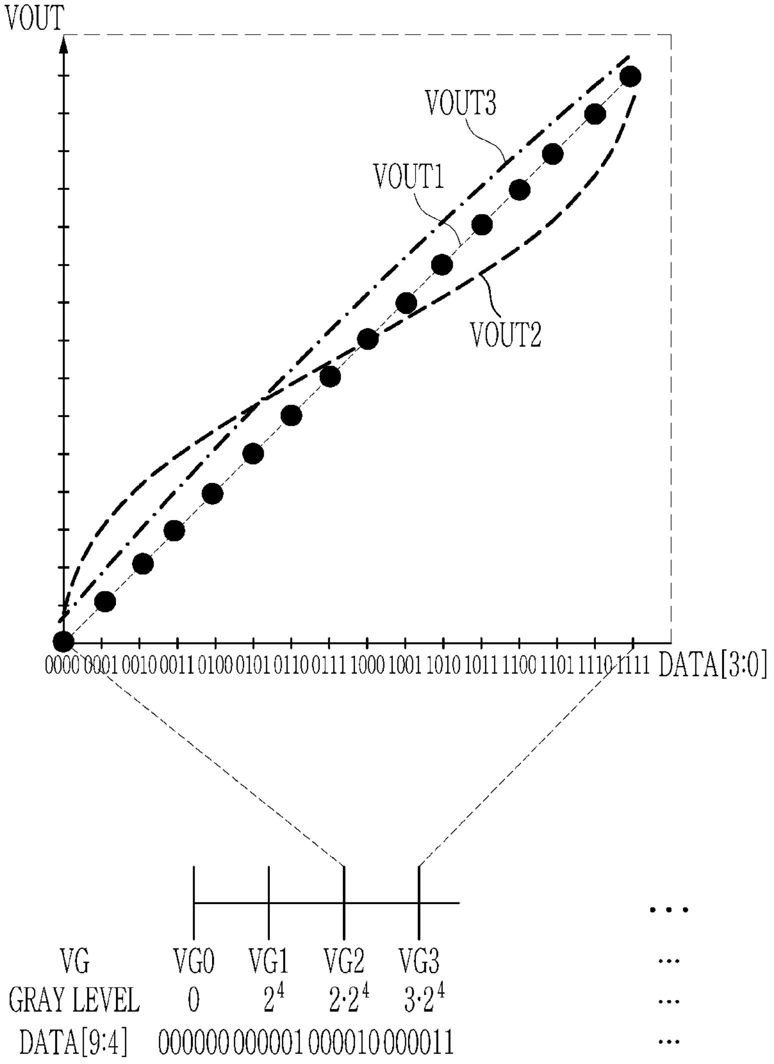
FIG. 10 illustrates a graph of an INL improvement effect of a semiconductor device according to an example embodiment.

FIG. 10 illustrates a graph of an INL improvement effect of a semiconductor device according to an example embodiment.

A plurality of gamma voltages (VG1, VG1, VG2, VG3, VG63) may correspond to a plurality of grayscale values (0, $2^4$, $2\cdot2^4$, $3\cdot2^4$, . . . , $2^6\cdot2^4$). In addition, the plurality of grayscale values (0, $2^4$, $2\cdot2^4$, $3\cdot2^4$, . . . , $2^6\cdot2^4$) may correspond to a plurality of high-order bit data values (DATA[9:4]) (000000, 000001, 000010, 000011, . . . , 111111).

When the high-order bit data value (DATA[9:4]) is 000010, the decoder 902 may output two gamma voltages VG2 and VG3 corresponding to 000010.

Ideally, the source amplifier 903 outputs an output signal VOUT1 that linearly increases as the low-order bit data value (DATA[3:0]) increases. However, actually, the source amplifier 903 outputs an output signal VOUT2 due to INL. In this regard, the actual output signal VOUT2 has a voltage difference from the ideal output signal VOUT1. The semiconductor device according to example embodiments may output an output signal VOUT3 within a predetermined range (for example, 3 standard deviations) of the ideal output signal VOUT1, by compensating the data DATA transmitted to the source driver 900 with a compensation value capable of offsetting the voltage difference.

Figure 11:
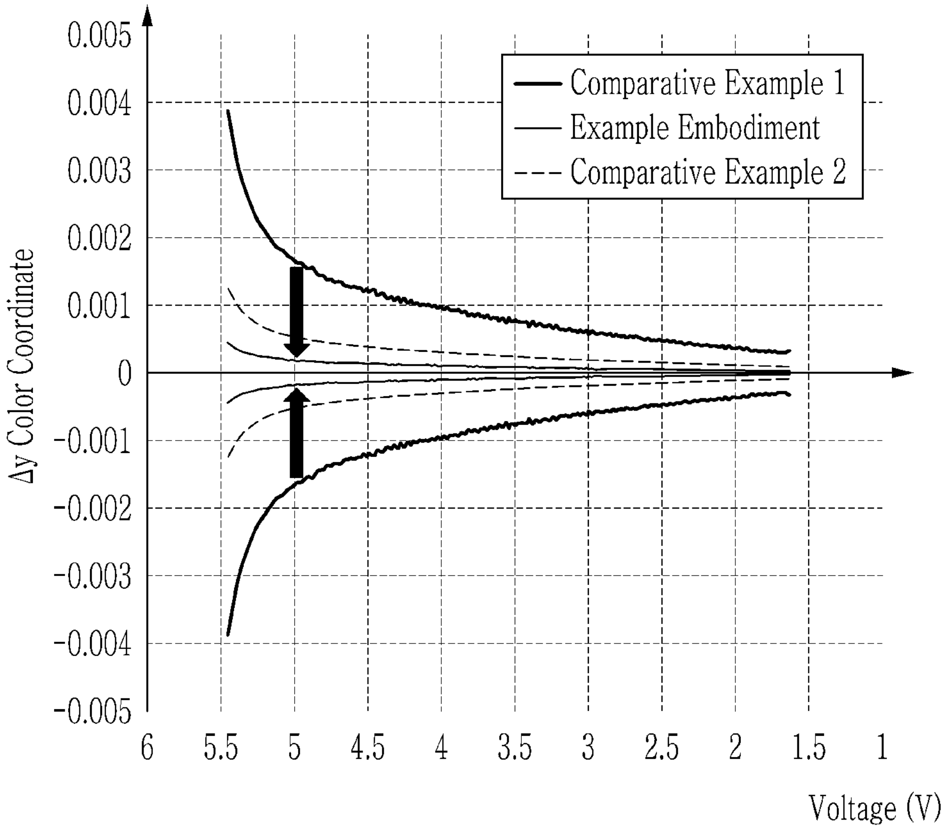
FIG. 11 illustrates a graph of an effect of reducing a color coordinate error of a semiconductor device according to an example embodiment.

FIG. 11 illustrates a graph of an effect of reducing a color coordinate error of a semiconductor device according to an example embodiment, as well as Comparative Example 1 and Comparative Example 2.

In the graph of FIG. 11, the X-axis is a voltage applied to the gate of the driving transistor (in the case of a PMOS) included in the pixel PX, and an increase in the X-axis direction represents an increased grayscale, a decrease in the X-axis direction represents a decrease in grayscale, and the Y-axis represents a color coordinate error.

Comparative Example 1 shows a color deviation according to a grayscale of an interpolation scheme that uses 6 bits as high-order bits and 4 bits as low-order bits without performing the compensation operation of the semiconductor device according to example embodiments.

Comparative Example 2 shows a color deviation according to a grayscale of an interpolation scheme that uses 7 bits as high-order bits in addition to Comparative Example 1.

Referring to the color deviation according to the grayscale of an example, it can be confirmed that the color deviation is significantly reduced compared to Comparative Example 1, and it can be confirmed that the color deviation is also reduced compared to Comparative Example 2 using more bits.

Therefore, according to the semiconductor device according to example embodiments, the color coordinate error may be improved, and thus display quality may be improved. In addition, according to the semiconductor device of example embodiments, by using the interpolation scheme, the area occupied by the decoder 902 and the power consumed by the decoder 902 may be reduced.

Figure 12:
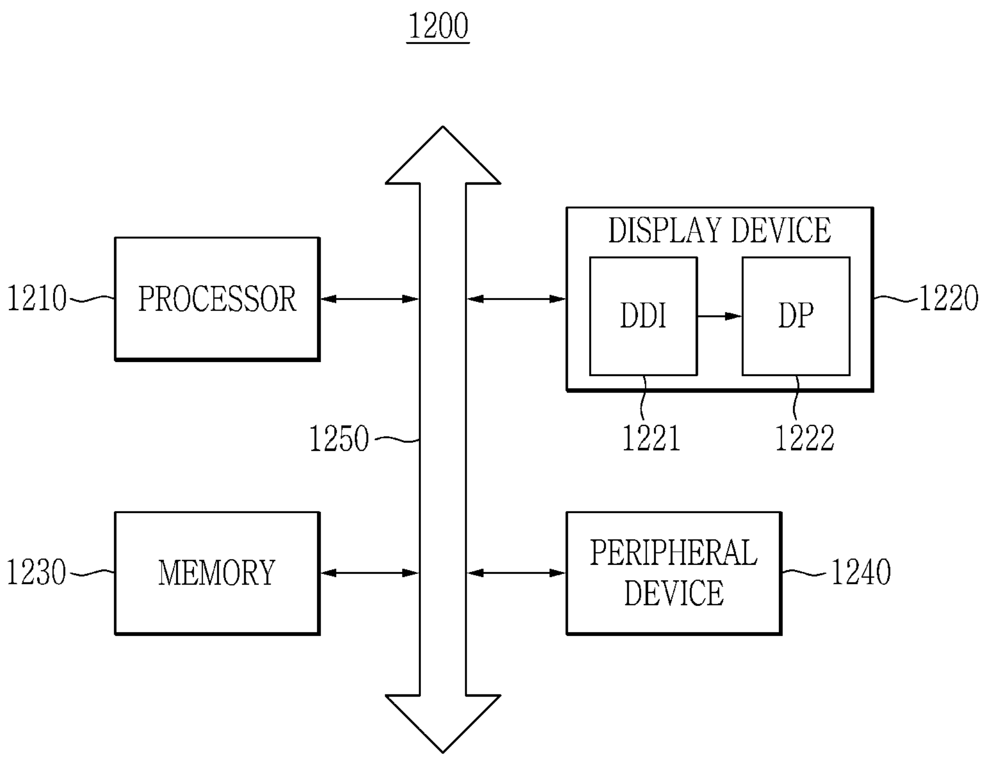
FIG. 12 illustrates a drawing for explaining a semiconductor system according to an example embodiment.

FIG. 12 illustrates a drawing for explaining a semiconductor system according to an example embodiment.

Referring to FIG. 12, a semiconductor system 1200 according to an example embodiment may include a processor 1210, a memory 1230, a display device 1220, and a peripheral device 1240 that are electrically connected to a system bus 1250.

The processor 1210 may control input and output of data of the memory 1230, the display device 1220, and the peripheral device 1240, and may perform image processing of image data transmitted between the corresponding devices.

The display device 1220 may include a DDI 1221 and a display panel 1222, and it may store image data applied through the system bus 1250 in a frame memory included in the DDI 1221 and then display it on the display panel 1222. The DDI 1221 may be the semiconductor device according to example embodiments. The DDI 1221 may gamma-correct input image data, and compensate the gamma-corrected gamma image data with a compensation value corresponding to the offset of the source driver of the DDI 1221. The compensation value may be stored in the LUT in the DDI 1221, and the DDI 1221 may compensate and/or interpolate the compensation value stored in the LUT in consideration of the temperature, brightness, and mode of the display device 1220.

The peripheral device 1240 may be a device that converts a moving image or a still image captured by a camera, a scanner, or a webcam into an electrical signal. The image data obtained through the peripheral device 1240 may be stored in the memory 1230, or may be displayed on the display panel 1222 in real time.

The memory 1230 may include a volatile memory such as a dynamic random access memory (DRAM) and/or a non-volatile memory such as a flash memory. The memory 1230 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (for example, a memory in which a static random access memory (SRAM) buffer, a NAND flash memory, and a NOR interface logic are combined). The memory 1230 may store image data obtained from the peripheral device 1240 or an image signal processed by the processor 1210.

The semiconductor system 1200 may be provided in a mobile electronic product such as a smart phone, but is not limited thereto, and may be provided in various electronic products that display images.

Figure 13:
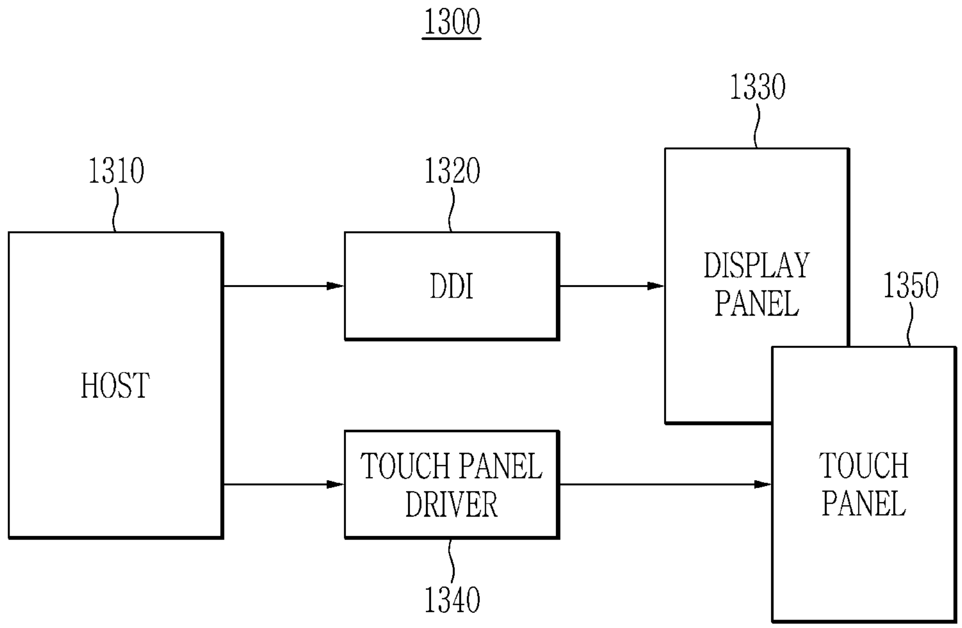
FIG. 13 illustrates a drawing for explaining a semiconductor system according to an example embodiment.

FIG. 13 illustrates a drawing for explaining a semiconductor system according to an example embodiment.

Referring to FIG. 13, a semiconductor system 1300 according to an example embodiment may include a host 1310, a DDI 1320, a display panel 1330, a touch panel driver 1340, and a touch panel 1350.

The host 1310 may receive data or instruction from a user, and control the DDI 1320 and the touch panel driver 1340 based on the received data or instruction. The DDI 1320 may drive the display panel 1330 under the control of the host 1310. The DDI 1320 may include the semiconductor device according to example embodiments. The DDI 1320 may gamma-correct input image data, and compensate the gamma-corrected gamma image data with a compensation value corresponding to the offset of the source driver of the DDI 1320. The compensation value may be stored in the LUT in the DDI 1320, and the DDI 1320 may compensate and/or interpolate the compensation value stored in the LUT in consideration of the temperature, brightness, and mode of the semiconductor system 1300.

The touch panel 1350 may be provided to overlap the display panel 1330. The touch panel driver 1340 may receive data sensed by the touch panel 1350 and transmit the data to the host 1310.

In some example embodiments, each constituent element or a combination of two or more constituent elements described with reference to FIG. 1 to FIG. 13 may be implemented as a digital circuit, a programmable or non-programmable logic device or array, an application specific integrated circuit (ASIC), or the like.

While aspects of example embodiments have been particularly shown and described, it will be understood that various changes in form and details may be made therein without departing from the spirit and scope of the following claims.

What is claimed is:

1. A semiconductor device comprising:

an offset compensation circuit configured to:

obtain first data comprising first low-order bit data, second low-order bit data and high-order bit data, select two compensation values from among a plurality of compensation values based on the first low-order bit data, identify a final compensation value by interpolating the two compensation values based on the second low-order bit data, and compensate the final compensation value to generate second data; and a source driver configured to interpolate and output two gamma voltages from among a plurality of gamma voltages based on the second data.

2. The semiconductor device of claim 1, wherein the offset compensation circuit is further configured to identify a tap, from among a plurality of taps, based on the high-order bit data, and wherein each of the plurality of taps comprises the plurality of compensation values corresponding to the first low-order bit data.

3. The semiconductor device of claim 2, wherein the offset compensation circuit is further configured to identify a group corresponding to brightness indicated by a brightness control instruction based on a plurality of groups, and wherein each of the plurality of groups comprises the plurality of taps corresponding to at least one specific value of the high-order bit data.

4. The semiconductor device of claim 3, wherein the offset compensation circuit is further configured to:

identify a gain value and an offset value corresponding to a temperature value among a plurality of gain values and a plurality of offset values, and compensate the plurality of compensation values by using the gain value and the offset value corresponding to the temperature value.

5. The semiconductor device of claim 4, wherein the plurality of gain values and the plurality of offset values are preset for the plurality of groups, respectively, and wherein the offset compensation circuit is further configured to identify the gain value and the offset value from among the plurality of groups.

6. The semiconductor device of claim 4, wherein the plurality of gain values and the plurality of offset values are preset for the plurality of taps, respectively, and wherein the offset compensation circuit is further configured to identify the gain value and the offset value from among the plurality of taps.

7. The semiconductor device of claim 4, wherein the plurality of gain values and the plurality of offset values respectively correspond to at least one temperature value, and wherein the offset compensation circuit is further configured to:

select the gain value and the offset value corresponding to the at least one temperature value that matches the temperature value from among the plurality of gain values and the plurality of offset values, and respectively interpolate two gain values and two offset values from among the plurality of gain values and the plurality of offset values based on the temperature value not matching the at least one temperature value.

8. The semiconductor device of claim 3, wherein each of the plurality of groups corresponds to at least one specific brightness, and wherein the offset compensation circuit is further configured to:

select the group corresponding to the at least one specific brightness that matches the brightness indicated by the brightness control instruction from among the plurality of groups, and interpolate two groups of the plurality of groups based on the brightness indicated by the brightness control instruction not matching the at least one specific brightness of the plurality of groups.

9. The semiconductor device of claim 2, wherein each of the plurality of taps corresponds to at least one value, and wherein the offset compensation circuit is further configured to:

select the tap corresponding to the at least one value that matches the high-order bit data, and interpolate two taps from among the plurality of taps based on the high-order bit data not matching the at last one value of the plurality of taps.

10. The semiconductor device of claim 2, wherein the offset compensation circuit is further configured to identify, based on an operation mode control instruction being enabled, a group corresponding to the operation mode control instruction from among a plurality of groups, and wherein each of the plurality of groups comprises the plurality of taps, and the plurality of taps provided in a first group of the plurality of groups are different from the plurality of taps provided in a second group of the plurality of groups.

11. The semiconductor device of claim 1, wherein the offset compensation circuit is further configured to receive image data from an external host, and gamma-correct the image data to generate the first data.

12. The semiconductor device of claim 1, wherein the offset compensation circuit is further configured to compensate the final compensation value to generate third data, and dither the third data to generate the second data.

13. The semiconductor device of claim 1, wherein the first data and the second data comprise a common number of bits.

14. The semiconductor device of claim 1, wherein the offset compensation circuit is further configured to store a look-up-table comprising the plurality of compensation values.

15. A semiconductor device for a display device, comprising:

a gamma converter configured to receive n-bit image data and gamma-correct the n-bit image data to generate m-bit gamma image data;

a storage circuit configured to store a look-up table comprising a plurality of compensation values corresponding to the m-bit gamma image data;

a compensation circuit configured to:

identify two compensation values corresponding to a high-order bit data value and a first low-order bit data value of the m-bit gamma image data, from among the plurality of compensation values, and compensate the m-bit gamma image data based on a final compensation value obtained by interpolating the two compensation values using a second lower-order bit data value of the m-bit gamma image data to output a compensated gamma image; and a dithering circuit configured to dither the compensated gamma image into n-bit data and outputs the n-bit data, wherein m and n are natural numbers greater than one.

16. The semiconductor device of claim 15, wherein the compensated gamma image, based on a brightness setting of the display device being a first brightness, is different from the compensated gamma image based on the brightness setting of the display device being a second brightness different from the first brightness.

17. The semiconductor device of claim 15, wherein the compensated gamma image before a mode of the display device is changed is different from the compensated gamma image after the mode of the display device is changed.

18. The semiconductor device of claim 15, wherein the compensated gamma image based on a temperature of the display device being a first temperature is different from the compensated gamma image based on the temperature of the display device being a second temperature different from the first temperature.

19. A semiconductor device comprising:

a display panel comprising a plurality of pixels connected to a plurality of gate lines and a plurality of source lines;

a gamma voltage generator configured to generate a plurality of gamma voltages having different voltage levels;

a source driver connected to the plurality of source lines, and configured to generate an output signal corresponding to n-bit data using the plurality of gamma voltages, and transmit the output signal to a corresponding source line of the plurality of source lines; and a driving controller configured to:

gamma-correct an n-bit input image signal to generate m-bit gamma image data, select two compensation values corresponding to first low-order bit data of the m-bit gamma image data from among a plurality of compensation values, interpolate the two compensation values based on a second low-order bit data of the m-bit gamma image data to obtain a final compensation value, and add the final compensation value to the m-bit gamma image data to generate the n-bit data, wherein n is a natural number greater than one and m is a natural number greater than n.

20. The semiconductor device of claim 19, wherein the source driver comprises:

a decoder configured to output two gamma voltages corresponding to high-order bit data of the n-bit data from among the plurality of gamma voltages; and a source amplifier configured to interpolate the two gamma voltages based on low-order bit data of the n-bit data to generate the output signal.

* * * * *